(12) United States Patent
Turcan

(10) Patent No.: US 10,763,747 B2
(45) Date of Patent: Sep. 1, 2020

(54) CONTROLLED ADAPTIVE POWER LIMITER

(71) Applicant: Microchip Technology Incorporated, Chandler, AZ (US)

(72) Inventor: Gheorghe Turcan, Bucharest (RO)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/651,713

(22) Filed: Jul. 17, 2017

(65) Prior Publication Data

US 2018/0026534 A1 Jan. 25, 2018

Related U.S. Application Data

(60) Provisional application No. 62/364,131, filed on Jul. 19, 2016.

(51) Int. Cl.
*H02M 3/156* (2006.01)
*H02M 1/32* (2007.01)
*H02M 1/08* (2006.01)
H02M 3/335 (2006.01)
H02M 1/00 (2006.01)

(52) U.S. Cl.
CPC .............. *H02M 3/156* (2013.01); *H02M 1/08* (2013.01); *H02M 1/32* (2013.01); H02M 3/33507 (2013.01); H02M 2001/0009 (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
USPC .................................................. 323/299–302
See application file for complete search history.

(56) References Cited

U.S. PATENT DOCUMENTS 5,841,643 A * 11/1998 Schenkel .......... H02M 3/33507
323/282
8,879,289 B2 11/2014 Lin et al. ........................ 363/97
2002/0140407 A1* 10/2002 Hwang ............... H02M 1/4225
323/207

(Continued)

FOREIGN PATENT DOCUMENTS

CN 101795077 A 8/2010
CN 102916586 A 2/2013

(Continued)

OTHER PUBLICATIONS

Op-amp Comparator, p. 2. Retrive from https://www.electronics-tutorials.ws/opamp/op-amp-comparator.html.*

(Continued)

*Primary Examiner* — Bryan R Perez
(74) *Attorney, Agent, or Firm* — Slayden Grubert Beard PLLC

(57) ABSTRACT

A power limiter for a switched mode power supply includes an operational amplifier and a comparator circuit. The operational amplifier is configured to receive an input voltage supplied to the SMPS as a first input and a reference voltage as a second input. The comparator circuit is configured to receive an output of the operational amplifier, receive a current sense signal, and generate an output signal configured to control a power generator. The output signal is based on a comparison between the output of the operational amplifier and the current sense signal.

18 Claims, 3 Drawing Sheets

(56) References Cited

U.S. PATENT DOCUMENTS

| | | | |
|---|---|---|---|
| 2005/0219870 A1* | 10/2005 | Yang | H02M 3/33507 363/21.01 |
| 2010/0295476 A1* | 11/2010 | Franco | G05F 1/561 315/297 |
| 2011/0254524 A1 | 10/2011 | Ishii | 323/282 |
| 2012/0256609 A1* | 10/2012 | Mei | H02M 3/156 323/282 |
| 2013/0120891 A1* | 5/2013 | Truong | H02M 1/32 361/93.9 |
| 2013/0187550 A1* | 7/2013 | Lo | H05B 33/0824 315/122 |

FOREIGN PATENT DOCUMENTS

| | | | |
|---|---|---|---|
| JP | 11252908 A | 9/1999 | H02H 3/087 |
| JP | 2006158091 A | 6/2006 | H02M 3/155 |

OTHER PUBLICATIONS

International Search Report and Written Opinion, Application No. PCT/US2017/042515, 13 pages, dated Oct. 12, 2017.
Chinese Office Action, Application No. 201780013396.5, 17 pages, dated Jun. 19, 2020.

* cited by examiner

CONTROLLED ADAPTIVE POWER LIMITER

PRIORITY

This application claims priority to U.S. Provisional Application No. 62/364,131 filed on Jul. 19, 2016, which is hereby incorporated by reference herein for all purposes.

TECHNICAL FIELD

The present disclosure relates to power limiters and, in particular, switched mode power supplies (SMPS).

BACKGROUND

An SMPS actively regulates its output voltage by switching the output on and off in a duty cycle. The output of the SMPS may be given by the relative duration of the on and off portions of the duty cycle. This may be in contrast to linear power supplies, wherein power is dissipated in, for example, a transistor. SMPSs may be implemented as, for example, buck converters, boost converters, or buck-boost converters. An SMPS may regulate output voltage or current by switching ideal storage elements such as inductors and capacitors into and out of different electrical configurations. If a power source, an inductor, a switch, and the corresponding electrical ground are placed in series and the switch is driven by a square wave, the peak-to-peak voltage of the waveform measured across the switch can exceed the input voltage from the DC source. This is because the inductor responds to changes in current by inducing its own voltage to counter the change in current, and this voltage adds to the source voltage while the switch is open. If a diode-and-capacitor combination is placed in parallel to the switch, the peak voltage can be stored in the capacitor, and the capacitor can be used as a DC source with an output voltage greater than the DC voltage driving the circuit. This boost converter acts like a step-up transformer for DC signals. A buck-boost converter works in a similar manner, but yields an output voltage which is opposite in polarity to the input voltage. Other buck circuits exist to boost the average output current with a reduction of voltage. In an SMPS, the output current flow depends on the input power signal, the storage elements and circuit topologies used, and also on the modulation and duty cycle to drive the switching elements. The spectral density of these switching waveforms has energy concentrated at relatively high frequencies. As such, switching transients and ripple introduced onto the output waveforms can be filtered with a small LC filter.

SUMMARY

Figure 1:
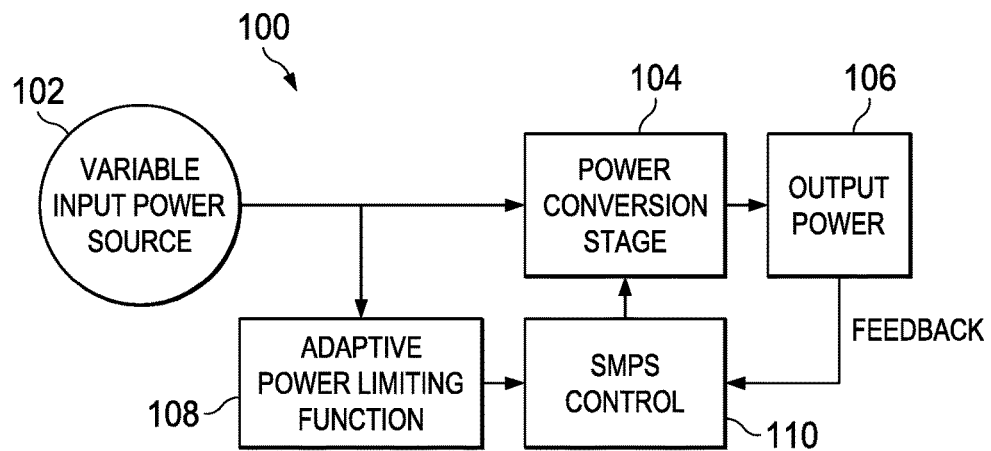
FIG. 1 is an illustration of an example SMPS using an adaptive input power limiter, according to embodiments of the present disclosure.

Embodiments of the present disclosure include a power limiter. The power limiter may be for an SMPS. The power limiter may include an operational amplifier and a comparator circuit. The operational amplifier may be configured to receive an input voltage supplied to the SMPS as a first input and a reference voltage as a second input. The comparator circuit may be configured to receive an output of the operational amplifier, receive a current sense signal, and generate an output signal configured to control a power generator. In combination with any of the above embodiments, the output signal may be based on a comparison between the output of the operational amplifier and the current sense signal. In combination with any of the above embodiments, the output of the operational amplifier may be a current limit. In combination with any of the above embodiments, the comparator circuit may be further configured to generate the output signal based on a comparison between a set current limit and a measured current by comparing the output of the operational amplifier and the current sense signal. In combination with any of the above embodiments, the output signal may be configured to overwrite a feedback signal from output of the SMPS. In combination with any of the above embodiments, the output signal may be configured to overwrite a feedback signal from output of the SMPS. In combination with any of the above embodiments, the comparator circuit may be further configured to generate the output signal before reception of the feedback signal. In combination with any of the above embodiments, the operational amplifier and the comparator unit may be incorporated into a microcontroller. In combination with any of the above embodiments, the operational amplifier may be further configured to lower a current input limit as input voltage increases. In combination with any of the above embodiments, the operational amplifier may be further configured to lower a current input limit as input voltage increases according to a slope defined by one or more resistors connected between an input voltage source and the operational amplifier. In combination with any of the above embodiments, the operational amplifier may be further configured to maintain a current limit above zero based upon the reference voltage.

Also, embodiments of the present disclosure include an SMPS, including any of the power limiters of the above embodiments. The SMPS may include a pulse-width modulation power generator circuit configured to produce an output voltage based on a duty cycle of a pulse-width modulation output. The comparator circuit may be configured to receive a current sense signal based on output of the pulse-width modulation power generator circuit.

Furthermore, embodiments of the present disclosure include a microcontroller including any of the power limiters or SMPSs of the above embodiments.

In addition, embodiments of the present disclosure include methods performed by any of the power limiters, SMPSs, or microcontrollers of the above embodiments.

DETAILED DESCRIPTION

FIG. 1 is an illustration of an example SMPS 100 using an adaptive input power limiter, according to embodiments of the present disclosure.

SMPS 100 may include a variable input power source 102, a power conversion stage 104, SMPS control 110, and an adaptive power limiting function 108. Each of such elements may be implemented in any suitable combination of analog or digital circuitry, including instructions for execution by a processor. Power source 102 may include a voltage or current source. Power conversion stage 104 may switch power on and off according to a duty cycle to generate output power 106. Output power 106 may be fed back to SMPS control 110 in order to determine whether to adjust the power conversion stage 104 so as to maintain an expected level of output power 106. SMPS control 110 may specify the duty cycle and other operational parameters of SMPS 100.

Figure 2:
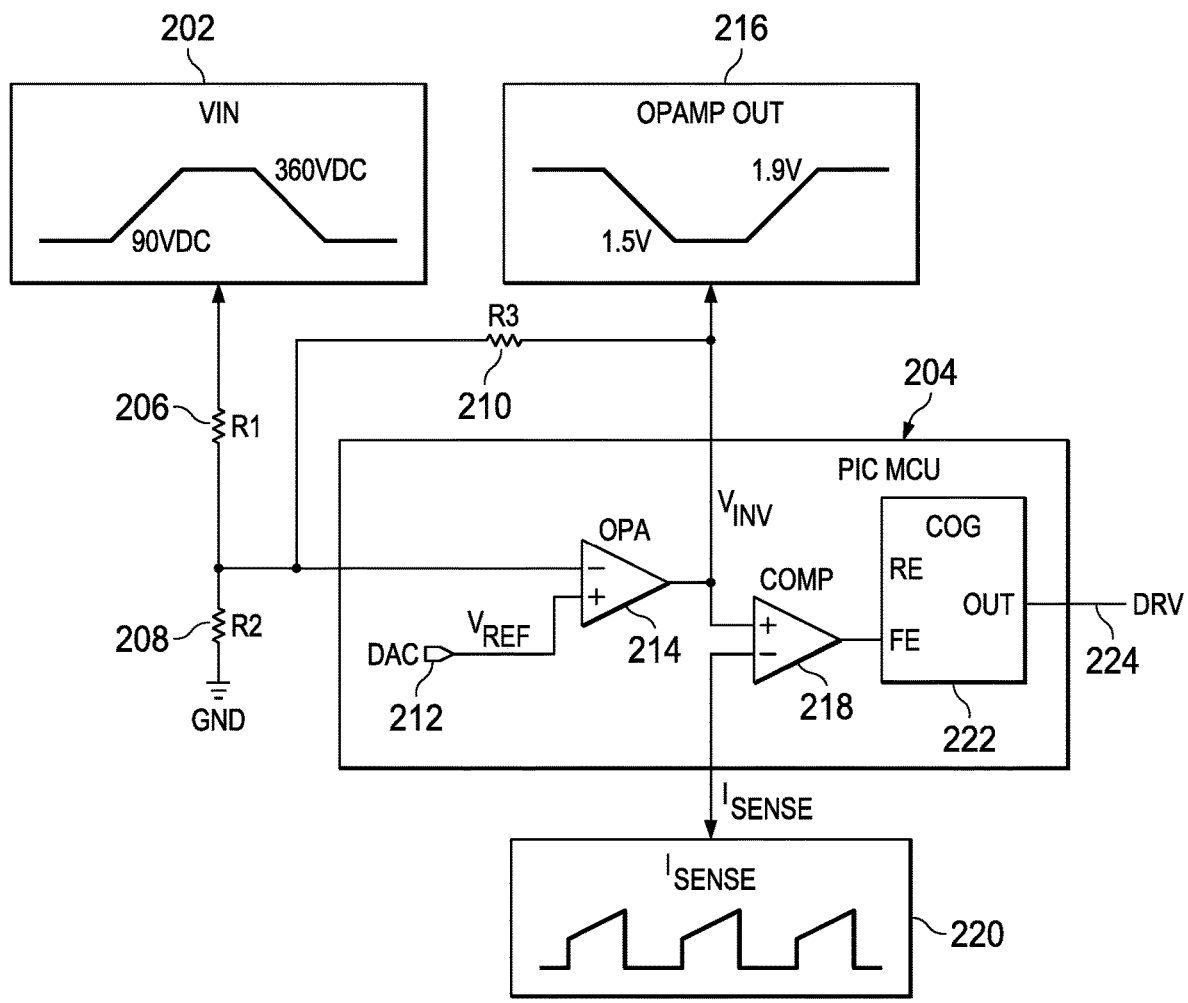
FIG. 2 is an illustration of an example adaptive input power limiter within the context of an SMPS, according to embodiments of the present disclosure.

SMPS 100 may prevent power conversion that exceeds the specified design by measuring output of the converter where the power is delivered, such as output power 106. In a fixed output voltage conversion design, the limit is placed on the delivered output current, while for a fixed output current conversion design, the limit is placed on the measured output voltage. Thus, while SMPS 100 is illustrated in FIG. 1 and FIG. 2 as measuring and evaluating current with respect to output voltage of SMPS 100, SMPS 100 might be implemented instead as measuring and evaluating voltage with respect to output current of SMPS 100.

Limiting techniques may be used to prevent damage or unwanted operation, even when the converted power is within specifications. Such a case can happen when the input voltage is smaller than the rated value. An undervoltage lockout will stop the conversion until the input voltage is within specified levels. Another case where the power conversion can be within specifications is an output overvoltage. In such a case, power conversion enters a shutdown state to protect the load from irreversible damage.

In one embodiment, adaptive power limiting function 108 may implement adaptive input power limits for SMPS 100. Embodiments of adaptive power limiting function 108 are shown in more detail in FIG. 2.

As discussed above, in SMPS 100 a variable input power source 102 may provide variable input voltage to SMPS 100. When there is variable input voltage, an overload or short circuit condition may arise when output power 106 rises too high.

Figure 3:
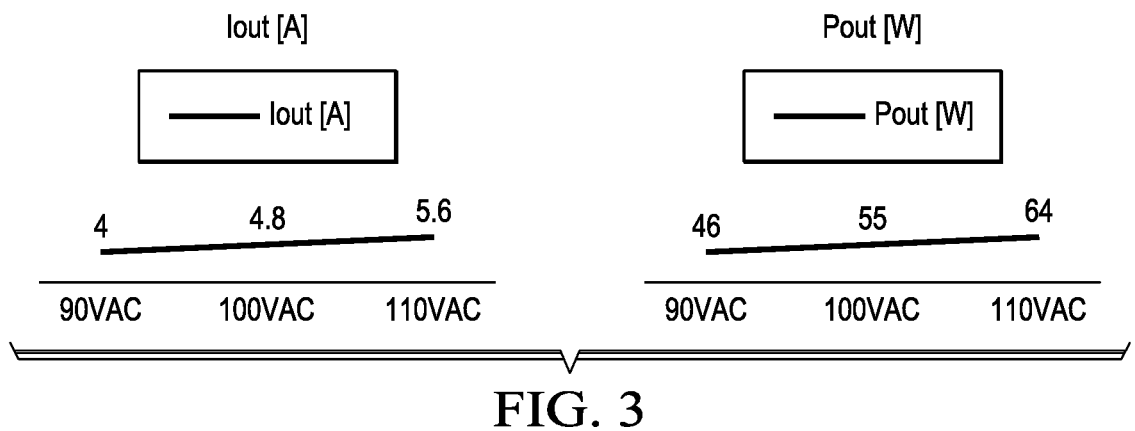
FIG. 3 illustrates a problem of potential overloads or short circuits addressed by embodiments of the present disclosure.
Figure 4:
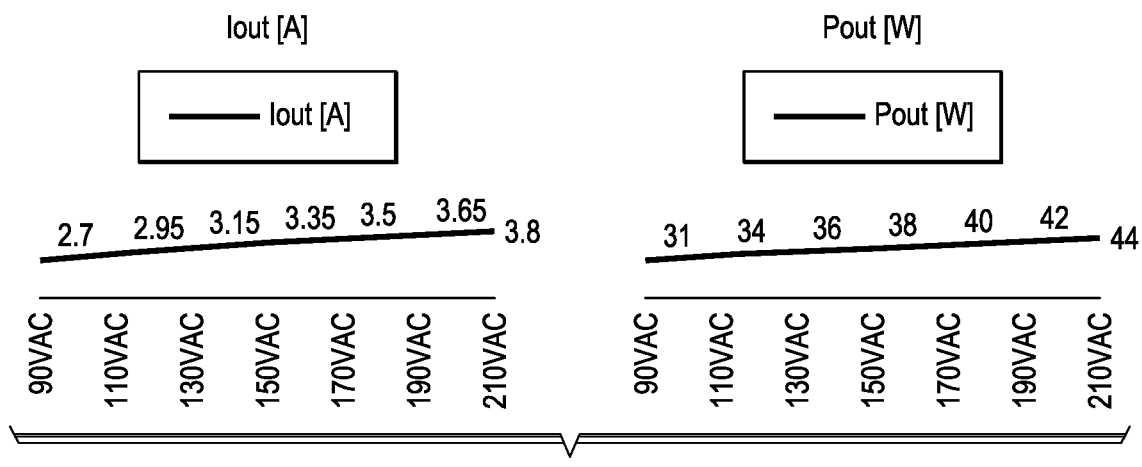
FIG. 4 illustrates a problem of potential overloads or short circuits when current limiters are used and addressed by embodiments of the present disclosure.

FIG. 3 illustrates a problem of possible overloads or short circuits with other SMPSs. For example, an offline 20 W flyback SMPS was tested with different input voltages and the output current was varied to simulate an overload. Current and power values where the output voltage dropped by 0.5V with respect to the desired value are plotted in FIG. 3. 90, 100, and 110 volts AC inputs are shown as reference. Response with respect to current and power output are shown in FIG. 3. Another input value, 170 volts AC, not shown in FIG. 3, produced an 8 A output and 93 W before the output voltage decreased 0.5V. Other solutions may prevent such overloading by adding an input current limit, using a digital-to-analog converter (DAC). However, a further problem arises because such solutions are based upon a calculated input voltage. The input voltage may change when, for example, a variable input voltage or power source is used such as an SMPS 100 or when a voltage or power source, otherwise assumed to be constant, degrades, changes, or is affected by noise or other ambient conditions and does not provide the assumed voltage source. FIG. 4 illustrates such a problem of possible overloads or short circuits with other SMPSs that use current limiting. A similar test as was performed for FIG. 3 to determine at what output current and power that the output voltage would drop by 0.5 volts while a current limit is calculated to limit output power to 31 W at 90 volts AC. As shown in FIG. 4, even while the intended power limit was approximately functional at the desired set point of 30 W at 90 volts AC, as the input voltage increased the output current and power continued to rise significantly, which would still cause overload and short circuit problems.

These other SMPS systems often determine a fixed threshold reference on inductor current that will take over the control loop and will end the pulse earlier. The fixed threshold level is often implemented with a comparator with a fixed limit level or an error signal. A comparator may stop the PWM pulse earlier if the threshold level is passed, or another comparator with a higher, fixed threshold level may stop the IC for a limited time to prevent component damage.

These other SMPS systems may utilize a fixed duty-cycle limit to prevent damage. However, this works only for a fixed input voltage and fixed output voltage converter. Furthermore, the converter may have to be calculated exactly to limit the desired power limit to the duty cycle and still work properly in normal operation conditions. Once designed, the limit is not configurable. In such cases, output power rises with the increase of the input voltage. In such a solution using only a maximum duty cycle limit, there is no current limit from the primary cycle. At 160 VAC input, the load can take 93 W of power from the SMPS without losing output regulation; thus, the SMPS components will fail.

These other SMPS systems may utilize a fixed primary-peak current limit. However, in these systems when the input voltage of the converter is variable for the same power transfer, the current signal will become smaller. This may result in a higher power transfer before reaching the set limit. Because the limit is fixed, configuration is not possible.

These other SMPS systems may utilize an output current limit. However, this technique becomes very expensive in isolated designs as having multiple signals pass through the isolation barrier can become very costly. As the limit is fixed, configuration is not possible. These results prove that the classic limit approach works only if there is direct access to the output current signal. It does not work with a system with large input variations and isolation needs.

Returning to FIG. 1, SMPS 100 may be configured to address aspects of the shortcomings of systems whose performance is shown in FIGS. 3 and 4. SMPS 100 may be configured to limit the total power conversion produced as an output. Furthermore, SMPS 100 may be configured to prevent damage to a load connected to output of SMPS 100. In addition, SMPS 100 may be configured to prevent high short-circuit impulses. Also, SMPS 100 may be configured to prevent transformer core saturation. In one embodiment, SMPS 100 may be configured to provide user control over power limits.

In one embodiment, SMPS 100 can be configured to adapt the limit of the output power of SMPS 100 while still giving the user of SMPS 100 the ability to change the limit. In another embodiment, the limit, after being set, may apply to variable input voltages. SMPS 100 may be configured to adapt to a wide variety of input voltages from variable input power source 102. The variations in power may be by design, or may arise from degradation, malfunction, or noise affecting the source. The output power may be maintained below a set limit. The adaptable limit of the output power of SMPS 100 may be implemented with circuitry, including hardware or software executed by a microcontroller.

Adaptive power limiting function 108 may be communicatively coupled to variable input power source 102 and to SMPS control 110. Thus, adaptive power limiting function 108 may be placed on the primary side of SMPS 100 and of the converter (power conversion stage 104) thereof. Accordingly, adaptive power limiting function 108 may be able to set, change, or affect the duty-cycle values controlled by SMPS control 110. This may include the maximum duty-cycle limit set therein. In one embodiment, this limit may adapt to the input voltage variation. In a further embodiment, this may be implemented by an inverse proportional function implemented in adaptive power limiting function 108. Consequently, adaptive power limiting function 108 may limit the maximum output power delivery in output power 106 from the primary of the power conversion stage 104 by limiting the amount of primary current into power conversion stage 104 based on the voltage from variable input power source 102. When output power 106 reaches sufficient limits, further, higher output voltage feedback will be ignored.

An adaptable software limit may be implemented by an ADC and a DAC to change the set peak current limit. An internal set of limits is defined and attributed to a certain range of input voltages. The ADC measures a proportion of the input voltage and stores it in the memory. After each acquisition, the value is compared to the input voltage attributed in the limit array and the peak current limit is updated in the DAC. This solution is feasible when the input voltage changes are slow.

A hardware-based implementation may free a processor core from other SMPS-related tasks. The implementation may change the current limit inversely proportional to the input voltage change using one internal op-amp and one DAC. A resistor divider scales down the rectified input voltage and the op-amp is used to invert the signal, so when the input voltage rises, the current limit will adapt and fall. The DAC may be set as an op-amp positive input to raise the inverted signal over the 0V line. This signal may be compared with the current from the transformer primary and trigger a falling event on the pulse-width modulation generation circuit when the current reaches the set limit. The limit trigger may also be used to implement a shutdown or other functions in the circuit.

FIG. 2 is an illustration of an example adaptive input power limiter within the context of an SMPS, according to embodiments of the present disclosure. Furthermore, the adaptive input power limiter may be implemented in a microcontroller 204, such as a PIC microcontroller unit. In various embodiments, the adaptive input power limiter may be implemented in any other suitable electronic device.

Operation of adaptive power limiting function 108 may be performed in part by an op-amp 214. Op-amp 214 may receive as one input a voltage reference values, VREF. The value of VREF may be provided by a DAC 212 and may be output from elsewhere in SMPS 100, such as another component of microcontroller 204. Op-amp 214 may receive as another input a proportion of the input voltage 202 applied to SMPS 100. The input voltage, VIN 202, may be provided by variable input power source 102. In one embodiment, VIN 202 may be passed to op-amp 214 through a resistor network. The resistor network may include resistors 206, 208, 210 denoted R1, R2, R3. VIN 202 may be connected to resistor 206, which may be connected to resistor 208 and op-amp 214. Resistor 208 may be connected to ground. Resistor 210 may be connected between the output of op-amp 214 and the input of op-amp 214 as well as resistors 206, 208.

In one embodiment, op-amp 214 may be implemented within microcontroller 204. In another embodiment, op-amp 214 may be implemented separately from microcontroller 204. In yet another embodiment, resistors 206, 208, 210 may be implemented outside microcontroller 204.

Output of op-amp 214 may be shown as OPAMP OUT 216 in FIG. 2. OPAMP OUT 216 may be also denoted as VINV. Op-amp 214 may amplify and invert VIN 202 to product VINV. VINV may be passed as an input to a comparator 218. Comparator 218 may be implemented in any suitable combination of analog or digital circuitry, such as with an op-amp. Comparator 218 may accept as another input output of a current sensor, ISENSE 220. The current sensor may be implemented in any suitable combination of analog or digital circuitry. ISENSE 220 may represent the current produced as part of feedback received through output power 106.

The output of comparator 218 may be passed to a complementary output generator (COG) 222. COG 222 may be implemented in any suitable combination of analog or digital circuitry. COG 222 may be configured to, based upon voltage signal input, issue a drive signal representing the duty cycle signal that will drive the switched-mode operation of SMPS 100. COG 222 may include inputs for rising event (RE) and falling event (FE) signals. If input is connected to RE input, COG 222 may issue the duty cycle signal upon rising of its input. If input is connected to FE input, COG 222 may issue the duty cycle signal upon falling of its input. COG 222 may implement a driver of the duty-cycle signal.

As shown, ISENSE 220 illustrates current as issued with respect to output power 106. ISENSE illustrates that the current is zero during the off portion of the duty cycle, rising quickly to a base level when the on portion of the duty cycle is initiated, and rising thereafter until the off portion of the duty cycle.

Resistor 206 may limit the current sampled from the input. Op-amp 214 and resistor 210 may combine to implement an inverting function to VIN 202. Resistor 210 may dictate the intervening proportion. VREF 212 rises the output function of op-amp 214 above the 0V with the set value of VREF 212 so that the resulting function 216 can be used by comparator 218. Comparator 218 may provide a falling event to COG 222 when the output of op-amp 214 is compared with ISENSE 220. This may happen before the output feedback regulation signal from 106 provides a falling event on COG 222 and overwrite the feedback falling event with an early falling event from comparator 218.

When op-amp 214 takes a portion of VIN 202 and inverses it, as VIN increases, OPAMP OUT 216 decreases. Accordingly, when voltage rises to otherwise dangerous levels, such as higher than 90V, op-amp 214 would otherwise go negative except for the shift provided by VREF 212. VREF 212 may thus cause OPAMP OUT 216 to stay above zero volts. Furthermore, a user or designer of SMPS 100 may set VREF according to desirable outputs. As shown in FIG. 2, at a 90V level of VIN 202, OPAMP OUT 216 may be at 1.9V. After rising to, for example, 360V of VIN 202, OPAMP OUT 216 may be at 1.5V. OPAMP OUT 216 may represent or be proportional to an effective current limit for SMPS 100. Thus, as VIN 202 rises, the current limit of SMPS 100 may decrease. The slopes and values of OPAMP OUT 216 may be dependent upon resistor and VREF values, discussed further below.

Accordingly, when the decreased current limit is reached, as ascertained by comparator 218, the output drive signal is stopped and thus the output power is lessened. COG 222 may drive a pulse width modulated square wave signal, the width of which powers output of SMPS 100.

As a result, SMPS 100 may implement a direct duty-cycle limit on the driver (COG 222). This limit, to the outside of SMPS 100, may be seen as a maximum power limitation. Moreover, this power limitation may be independent to adapt with the input voltage variation.

A user or designer of SMPS 100 may allow users to change the output power limit. As op-amp 214 generates an inverse-proportional waveform to the input voltage, the proportionality may be given by the relationship between resistors 206, 208, 210. This relationship may be given by:

$$V_{INV} = V_{REF} - R3 \times \left(\frac{V_{IN}}{R1} - \frac{V_{REF}}{R2}\right)$$

This relationship expresses how resistors 206, 208, 210 and op-amp 204 are used to generate a waveform inversely-proportional to VIN 202, so when the output voltage rises the limit will drop and adjust. In one example, resistor 206 may be selected as 1 MOhm to limit the current that goes to the rest of the adaptive limit circuit, resistor 208 may be selected as 51 KOhm, resistor 210 may be selected as 1.5 KOhm, and VREF 212 can be set to 2V. Thus, the set limit of VINV will be 1.9V when the rectified input voltage is 90 VDC, and 1.5V when the rectified input voltage is 360 VDC.

The limits used in SMPS 100 may be automatically changed or utilized in various situations. For example, a designer or user of SMPS 100 may control the maximum power delivery at any moment during runtime. A user may be notified or the power limit further reduced after multiple instances of limiting operation. A time limit may be applied to the maximum allowed power conversion. For example, an 100 W converter can be set to deliver a maximum 80 W after five years of operation to extend the lifetime of the product and prevent wear and tear. Furthermore, a user may use the same instance of SMPS 100 for multiple applications, wherein the maximum allowed power is adjusted on the basis of the application. For example, the user may use a 100 W/12V converter to power a 100 W load, a 60 W load and a 20 W load separately without the need of having three separate converters. Furthermore, the necessary protections and functions will work correctly in all instances. SMPS Control 110 and Adaptive Power Limiting Function 108, though implementable in a microcontroller, need not use the microcontroller core. Accordingly, logic may be installed to detect triggering of the limiting operation to identify when the power delivery is at limit, without compromising the safety of the conversion.

Figure 5:
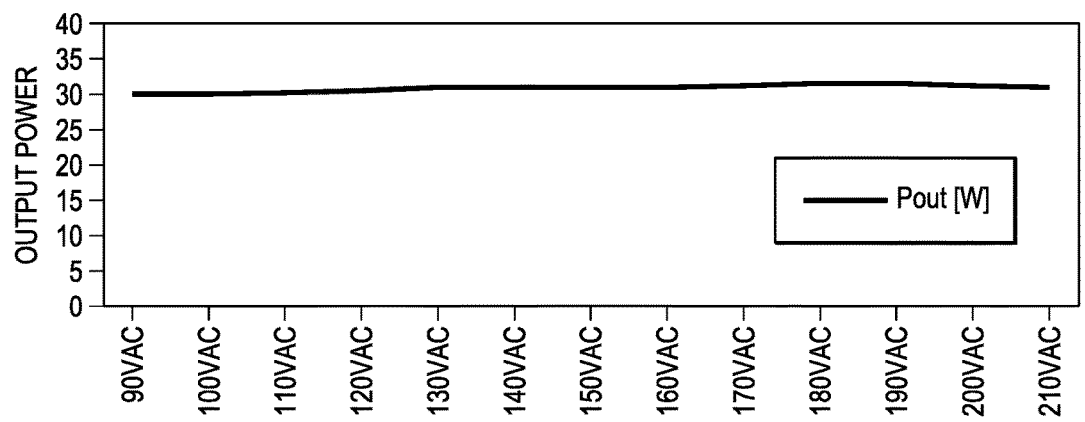
FIG. 5 illustrates example performance of an SMPS using an adaptive input power limiter, according to embodiments of the present disclosure.

FIG. 5 illustrates example performance of SMPS 100 using an adaptive input power limiter, according to embodiments of the present disclosure. A set limit for 30 W may be set. The minimum and maximum values of testing are 30 W and 31.5 W, respectively. As the input voltage rises, the output power is nonetheless controlled.

Figure 6:
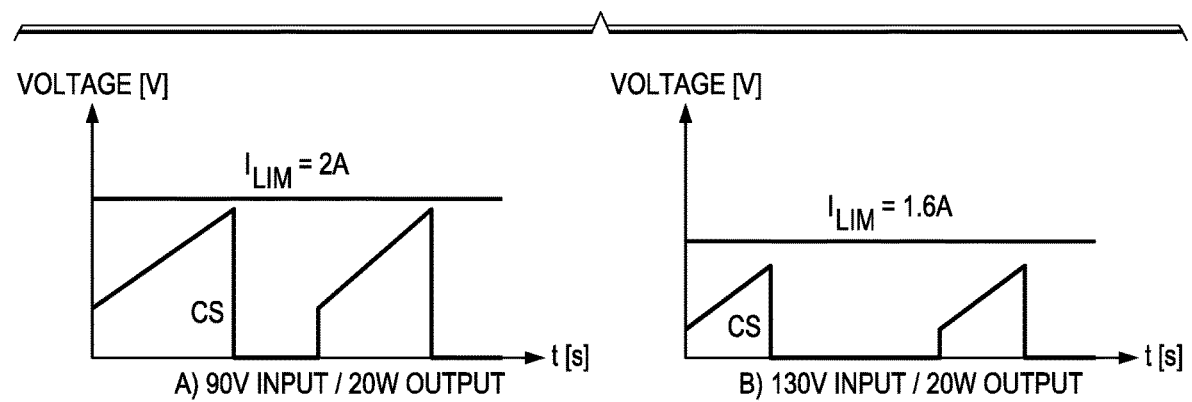
FIG. 6 illustrates further example performance of SMPS 100 using an adaptive input power limited, according to embodiments of the present disclosure.

FIG. 6 illustrates further example performance of SMPS 100 using an adaptive input power limiter, according to embodiments of the present disclosure. In particular, FIG. 6 illustrates current waveforms such as ISENSE 220 under different input voltage VIN 202. In (a), the input voltage is 90V, and in (b) the input voltage is 130V. As the input voltage rises from (a) to (b), the current limit adapts and falls from 2 A to 1.6 A based upon the operation of SMPS 100.

Although embodiments have been described in detail with particular reference to figures and examples, one of skill in the art would recognize that variations, additions, and modifications can be effected within the spirit and scope of the present disclosure.

The invention claimed is:

1. A power limiter for a switched mode power supply (SMPS), comprising:
    an operational amplifier configured to:
        receive an input voltage supplied to the SMPS as a first input; and
        a reference voltage as a second input;
    a comparator circuit configured to:
        receive an output of the operational amplifier;
        receive a current sense signal; and
        generate an output signal configured to control a power generator, the output signal based on a comparison between the output of the operational amplifier and the current sense signal;
    wherein the operational amplifier is further configured to lower a maximum current input limit of the SMPS as input voltage increases.

2. The power limiter of claim 1, wherein the output of the operational amplifier is a current limit.

3. The power limiter of claim 1, wherein the comparator circuit is further configured to generate the output signal based on a comparison between a set current limit and a measured current by comparing the output of the operational amplifier and the current sense signal.

4. The power limiter of claim 1, wherein the output signal is configured to overwrite a feedback signal from output of the SMPS.

5. The power limiter of claim 1, wherein:
    the output signal is configured to overwrite a feedback signal from output of the SMPS; and
    the comparator circuit is further configured to generate the output signal before reception of the feedback signal.

6. The power limiter of claim 1, wherein the operational amplifier and the comparator unit are incorporated into a microcontroller.

7. The power limiter of claim 1, wherein the operational amplifier is further configured to lower a current input limit as input voltage increases according to a slope defined by one or more resistors connected between an input voltage source and the operational amplifier.

8. The power limiter of claim 1, wherein the operational amplifier is further configured to maintain a current limit above zero based upon the reference voltage.

9. A switched mode power supply (SMPS), comprising:
    an operational amplifier configured to:
        receive an input voltage supplied to the SMPS as a first input; and
        a reference voltage as a second input;
    a pulse-width modulation power generator circuit configured to produce an output voltage based on a duty cycle of a pulse-width modulation output; and
    a comparator circuit configured to:
        receive an output of the operational amplifier;
        receive a current sense signal based on output of the pulse-width modulation power generator circuit; and
        generate an output signal configured to control the pulse-width modulation power generator, the output signal based on a comparison between the output of the operational amplifier and the current sense signal;
    wherein the operational amplifier is further configured to lower a maximum current input limit of the SMPS as input voltage increases.

10. The SMPS of claim 9, wherein the output of the operational amplifier is a current limit.

11. The SMPS of claim 9, wherein the comparator circuit is further configured to generate the output signal based on a comparison between a set current limit and a measured current by comparing the output of the operational amplifier and the current sense signal.

12. The SMPS of claim 9, wherein the output signal is configured to overwrite a feedback signal from output of the SMPS.

13. The SMPS of claim 9, wherein:
the output signal is configured to overwrite a feedback signal from output of the SMPS; and
the comparator circuit is further configured to generate the output signal before reception of the feedback signal.

14. The SMPS of claim 9, wherein the operational amplifier and the comparator unit are incorporated into a microcontroller.

15. The SMPS of claim 9, wherein the operational amplifier is further configured to lower a current input limit as input voltage increases according to a slope defined by one or more resistors connected between an input voltage source and the operational amplifier.

16. The SMPS of claim 9, wherein the operational amplifier is further configured to maintain a current limit above zero based upon the reference voltage.

17. A microcontroller, comprising:
a switched mode power supply (SMPS);
an operational amplifier configured to:
receive an input voltage supplied to the SMPS as a first input; and
a reference voltage as a second input; and
a comparator circuit configured to:
receive an output of the operational amplifier;
receive a current sense signal;
and
generate an output signal configured to control a power generator, the output signal based on a comparison between the output of the operational amplifier and the current sense signal;
wherein the operational amplifier is further configured to lower a maximum current input limit of the SMPS as input voltage increases.

18. The microcontroller of claim 17, wherein the output of the operational amplifier is a current limit.

\* \* \* \* \*